(12) United States Patent
Ono

(10) Patent No.: US 8,860,858 B2
(45) Date of Patent: Oct. 14, 2014

(54) SOLID-STATE IMAGE SENSOR, DRIVING METHOD THEREOF, AND CAMERA

(71) Applicant: Canon Kabushiki Kaisha, Tokyo (JP)

(72) Inventor: Toshiaki Ono, Ebina (JP)

(73) Assignee: Canon Kabushiki Kaisha, Tokyo (JP)

( * ) Notice: Subject to any disclaimer, the term of this patent is extended or adjusted under 35 U.S.C. 154(b) by 49 days.

(21) Appl. No.: 13/712,662

(22) Filed: Dec. 12, 2012

(65) Prior Publication Data

US 2013/0176468 A1 Jul. 11, 2013

(30) Foreign Application Priority Data

Jan. 10, 2012 (JP) ................................. 2012-002473

(51) Int. Cl.
| | |
|---|---|
| *H04N 5/225* | (2006.01) |
| *H04N 5/341* | (2011.01) |
| *H04N 5/335* | (2011.01) |
| *H04N 5/347* | (2011.01) |
| *H04N 5/374* | (2011.01) |
| *H04N 9/04* | (2006.01) |

(52) U.S. Cl.
CPC .............. *H04N 5/335* (2013.01); *H04N 5/347* (2013.01); *H04N 5/3742* (2013.01); *H04N 9/045* (2013.01)
USPC ........................... 348/280; 348/294; 348/262

(58) Field of Classification Search
CPC .............................. H04N 3/1575; H04N 5/347
USPC .................. 348/262–266, 272, 273, 280, 283
See application file for complete search history.

(56) References Cited

U.S. PATENT DOCUMENTS

| | | | | |
|---|---|---|---|---|
| 4,821,088 | A * | 4/1989 | Tabei et al. .................... | 348/280 |
| 7,602,431 | B2 * | 10/2009 | Takayama et al. ............ | 348/315 |
| 7,710,458 | B2 * | 5/2010 | Yuyama et al. ............ | 348/208.4 |
| 7,768,562 | B2 * | 8/2010 | Boemler ....................... | 348/302 |
| 7,787,037 | B2 | 8/2010 | Ono et al. ..................... | 348/296 |
| 7,796,170 | B2 * | 9/2010 | Hirota ........................... | 348/249 |
| 7,808,539 | B2 * | 10/2010 | Matsutani ..................... | 348/316 |
| 7,817,199 | B2 | 10/2010 | Yamashita et al. ............ | 348/308 |
| 7,986,353 | B2 | 7/2011 | Ono .............................. | 348/241 |
| 8,085,319 | B2 | 12/2011 | Ono et al. ..................... | 348/241 |
| 2006/0244841 | A1 * | 11/2006 | Ikeda .......................... | 348/222.1 |
| 2013/0016264 | A1 | 1/2013 | Ono ............................. | 348/308 |

FOREIGN PATENT DOCUMENTS

JP 5-41836 2/1993

* cited by examiner

*Primary Examiner* — Twyler Haskins
*Assistant Examiner* — Dwight C Tejano
(74) *Attorney, Agent, or Firm* — Fitzpatrick, Cella, Harper & Scinto

(57) ABSTRACT

A solid-state image sensor, comprising a pixel array complying with a Bayer array, a first signal processor configured to process each of red-pixel and blue-pixel signals output from the pixel array, a second signal processor configured to process each of green-pixel signals output from the pixel array, and a control unit configured to control the pixel array, the first signal processor, and the second signal processor, wherein the solid-state image sensor selects a readout method, by changing timings of the control signals, from a progressive method, an interlace method, and a pseudo-progressive method.

6 Claims, 11 Drawing Sheets

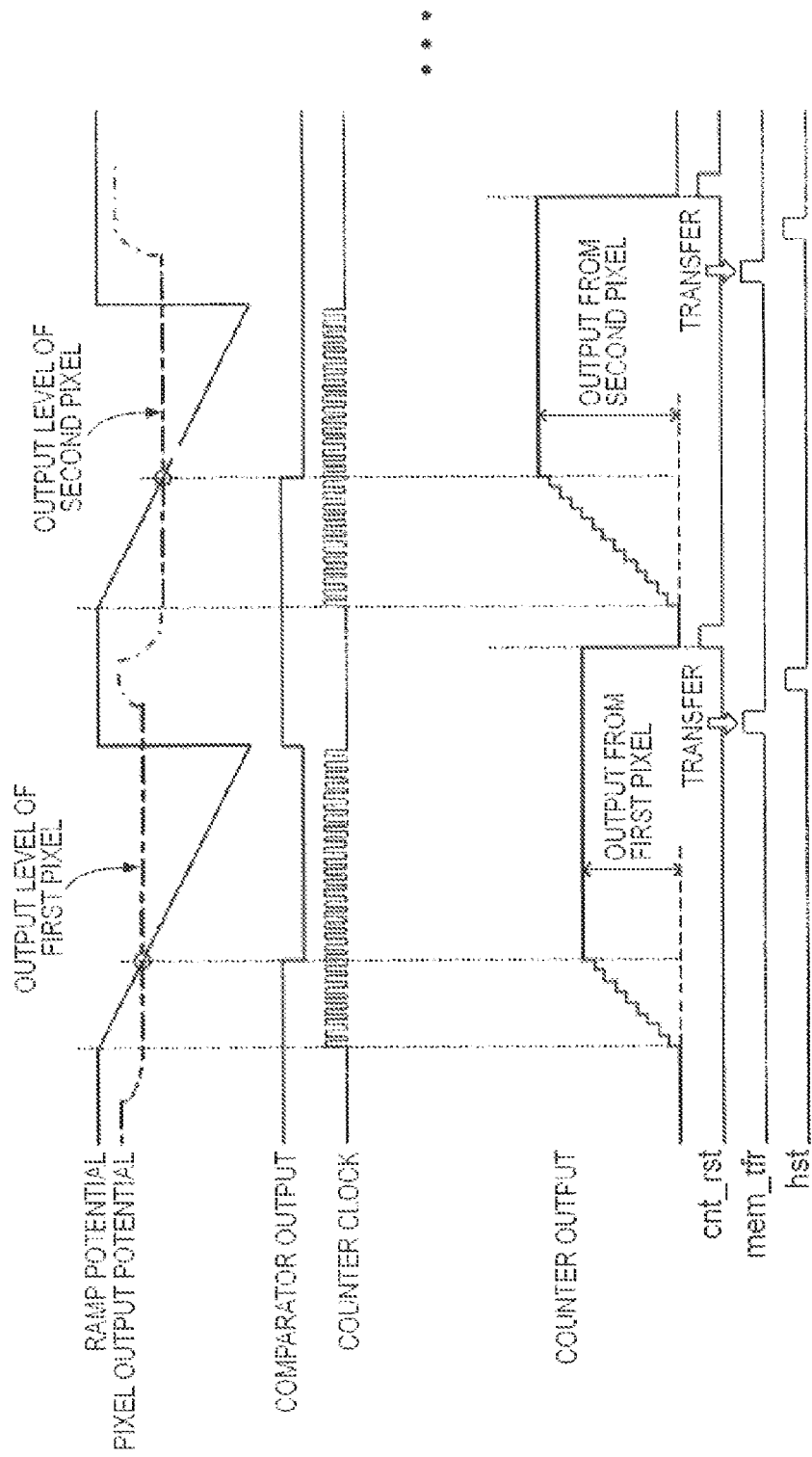

FIG. 5A

| L\H | 1 | 2 |
|---|---|---|
| 1 | G | R |
| 2 | B | G |
| 3 | G | R |
| 4 | B | G |
| 5 | G | R |
| 6 | B | G |
| 7 | G | R |
| 8 | B | G |
| ⋮ | G | R |

FIG. 5B

| L\H | 1 | 2 |
|---|---|---|
| 1 | G | R |
| 2 | B | G |
| 3 | G | R |
| 4 | B | G |
| 5 | G | R |
| 6 | B | G |
| 7 | G | R |
| 8 | B | G |
| ⋮ | G | R |

FIG. 5C

| L\H | 1 | 2 |
|---|---|---|
| 1 | G | R |
| 2 | B | G |
| 3 | G | R |
| 4 | B | G |
| 5 | G | R |
| 6 | B | G |
| 7 | G | R |
| 8 | B | G |
| ⋮ | G | R |

FIG. 5D

| L\H | 1 | 2 |
|---|---|---|
| 1 | G | R |
| 2 | B | G |
| 3 | G | R |
| 4 | B | G |
| 5 | G | R |
| 6 | B | G |
| 7 | G | R |
| 8 | B | G |
| ⋮ | G | R |

US 8,860,858 B2

SOLID-STATE IMAGE SENSOR, DRIVING METHOD THEREOF, AND CAMERA

BACKGROUND OF THE INVENTION

1. Field of the Invention

The present invention relates to a solid-state image sensor, driving method thereof, and camera.

2. Description of the Related Art

Japanese Patent Laid-Open No. 05-041836 discloses a technique of generating pixel signals equal in number to those read out by the progressive method while reading out pixel signals by the interlace method in a three-chip image sensing system. This method directly uses at least one signal obtained by the readout operation out of image signals of three colors, and can suppress degradation of the resolution.

However, the three-chip image sensing system further includes an optical system such as a dichroic prism in addition to three pixel arrays, so it is difficult to downsize this system. Also, it is hard to apply the technique of Japanese Patent Laid-Open No. 05-041836 to a single-chip image sensing system advantageous for downsizing because the pixel array has a different array.

SUMMARY OF THE INVENTION

The present invention provides a solid-state image sensor which can suppress degradation of the resolution while reading out image signals by the interlace method using a single-chip image sensing system, and is advantageous for downsizing.

One of the aspects of the present invention provides a solid-state image sensor comprising, a pixel array, a color filter array complying with a Bayer array, the color filter array provided in correspondence to the pixel array, a first signal processor configured to process each of red-pixel and blue-pixel signals output from the pixel array, a second signal processor configured to process each of green-pixel signals output from the pixel array, and a control unit configured to control the pixel array, the first signal processor, and the second signal processor, wherein the control unit controls the pixel array to sequentially output pixel signals of a plurality of rows from the pixel array by selecting two rows at a time, the first signal processor performs a first signal process including an addition process for red-pixel signals output by performing twice the output of two rows from the pixel array, and an addition process for blue-pixel signals output by performing twice the output of two rows from the pixel array, the second signal processor performs a second signal process including an addition process for green-pixel signals output by performing twice the output of two rows from the pixel array, and the first signal process and the second signal process are performed at timings different from each other, a red-image signal and blue-image signal for a first field of the pixel array are generated while generating green-image signals for a second field of the pixel array subsequent to the first field, and a red-image signal and blue-image signal for the second field are generated while generating green-image signals for the first field.

Further features of the present invention will become apparent from the following description of exemplary embodiments with reference to the attached drawings.

BRIEF DESCRIPTION OF THE DRAWINGS

FIG. 4 is a chart for explaining an example of a progressive readout operation;

FIGS. 5A to 5D are views for explaining a pixel array used in the description of the first embodiment;

DESCRIPTION OF THE EMBODIMENTS

First Embodiment

Figure 1:
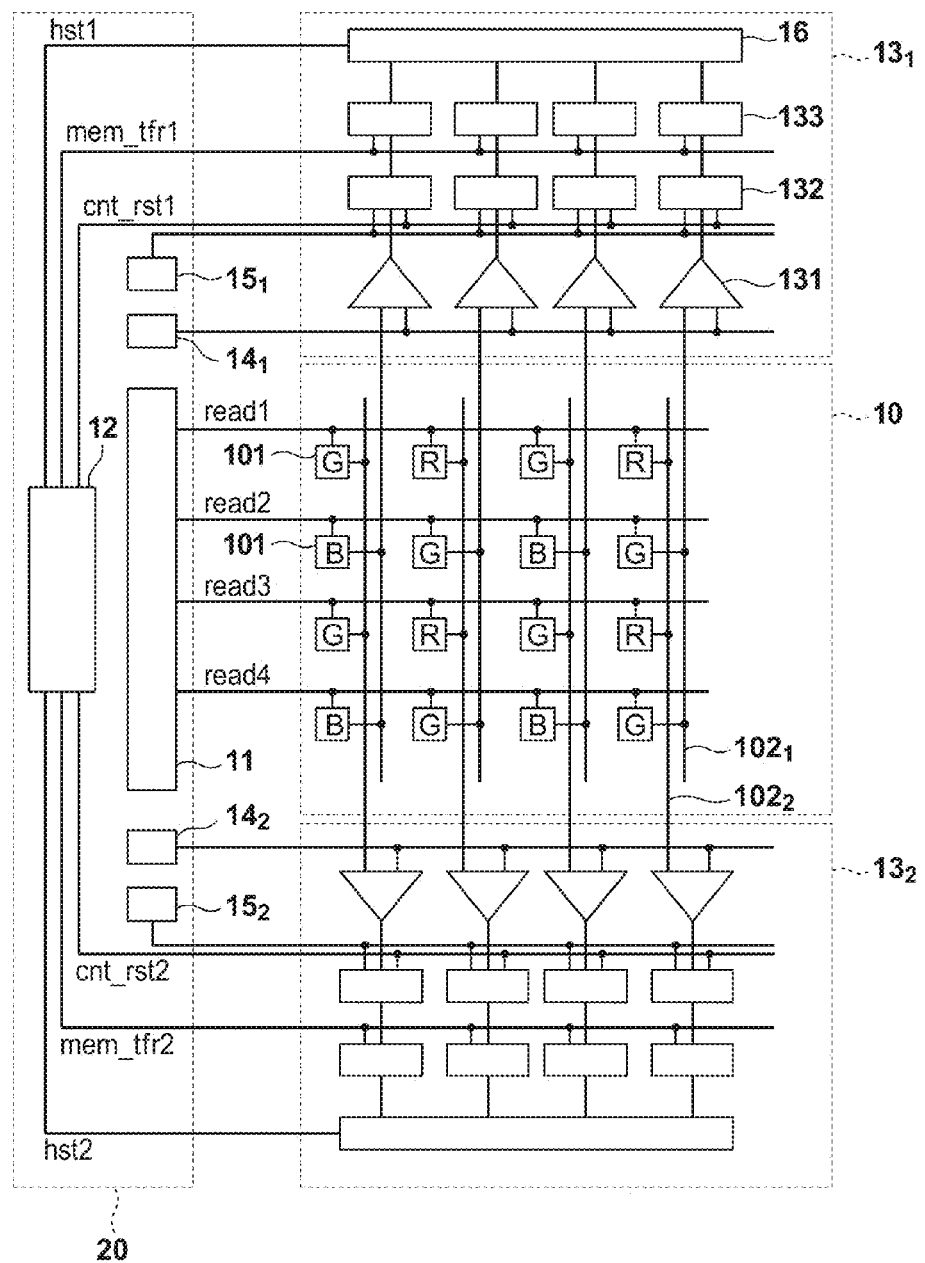
FIG. 1 is a circuit diagram for explaining an example of an arrangement according to the first embodiment.

A solid-state image sensor 1 according to the first embodiment will be described with reference to FIGS. 1 to 9. As exemplified in FIG. 1, the solid-state image sensor 1 includes a pixel array 10, a first signal processor $13_1$, a second signal processor $13_2$, and a control unit 20 which controls them. As the pixel array 10, a pixel array complying with the Bayer array (array in which green, red, and blue pixels 101 (to be referred to as G, R, and B, respectively) are arranged in a checkered pattern) is usable.

A pixel signal output from each pixel 101 of each column can be output to either of vertical signal lines $102_1$ and $102_2$ provided for each column. The vertical signal lines $102_1$ and $102_2$ are connected to the first and second signal processors $13_1$ and $13_2$, respectively. More specifically, red- and blue-pixel signals can be output to the first signal processor $13_1$, and green-pixel signals can be output to the second signal processor $13_2$. A pixel signal of green (or red or blue) means a signal output from a pixel in which a color filter of green (or red or blue) is arranged.

Each of the first and second signal processors $13_1$ and $13_2$ can include, for example, comparators 131, counters 132, memories 133, and a horizontal scanning circuit 16. The control unit 20 can include, for example, a vertical scanning circuit 11, ramp signal generators $14_1$ and $14_2$, count clock generators $15_1$ and $15_2$, and a timing generator 12. For example, the first signal processor $13_1$ can A/D-convert red- and blue-pixel signals using a ramp signal generated by the ramp signal generator $14_1$. The comparators 131 can compare signals (red- and blue-pixel signals) input via the vertical signal lines $102_1$ with a ramp signal input from the ramp signal generator $14_1$. An output from each comparator 131 indicates the comparison result, and is inverted when, for example, the magnitude relationship between the ramp signal and the pixel signal is inverted. The counter 132 can perform a count-up operation in accordance with clocks from the count clock generator $15_1$, and when an output from the comparator 131 is inverted, stop the count-up. A/D conversion can be executed by obtaining a count value corresponding to a readout pixel signal. Upon receiving a control signal mem_tfr1, the resultant value can be stored in the memory 133. A practical example of the count-up operation will be described later. Upon receiving a control signal hst1, the horizontal scanning circuit 16 can sequentially read out count values stored in the respective memories 133. The counter 132 is reset to an initial value upon receiving a control signal cnt_rst1, and can start A/D conversion for a pixel signal of the next row. The second signal processor $13_2$ can sequentially perform a signal process for green-pixel signals, similar to the first signal processor $13_1$.

In this manner, the first signal processor $13_1$ can process red- and blue-pixel signals output from the pixel array 10. Similarly, the second signal processor $13_2$ can process green-pixel signals output from the pixel array 10. The first signal processor $13_1$ and second signal processor $13_2$ are separately shown in FIG. 1, but may be arranged in the same region and individually operate in this region.

Figure 2:
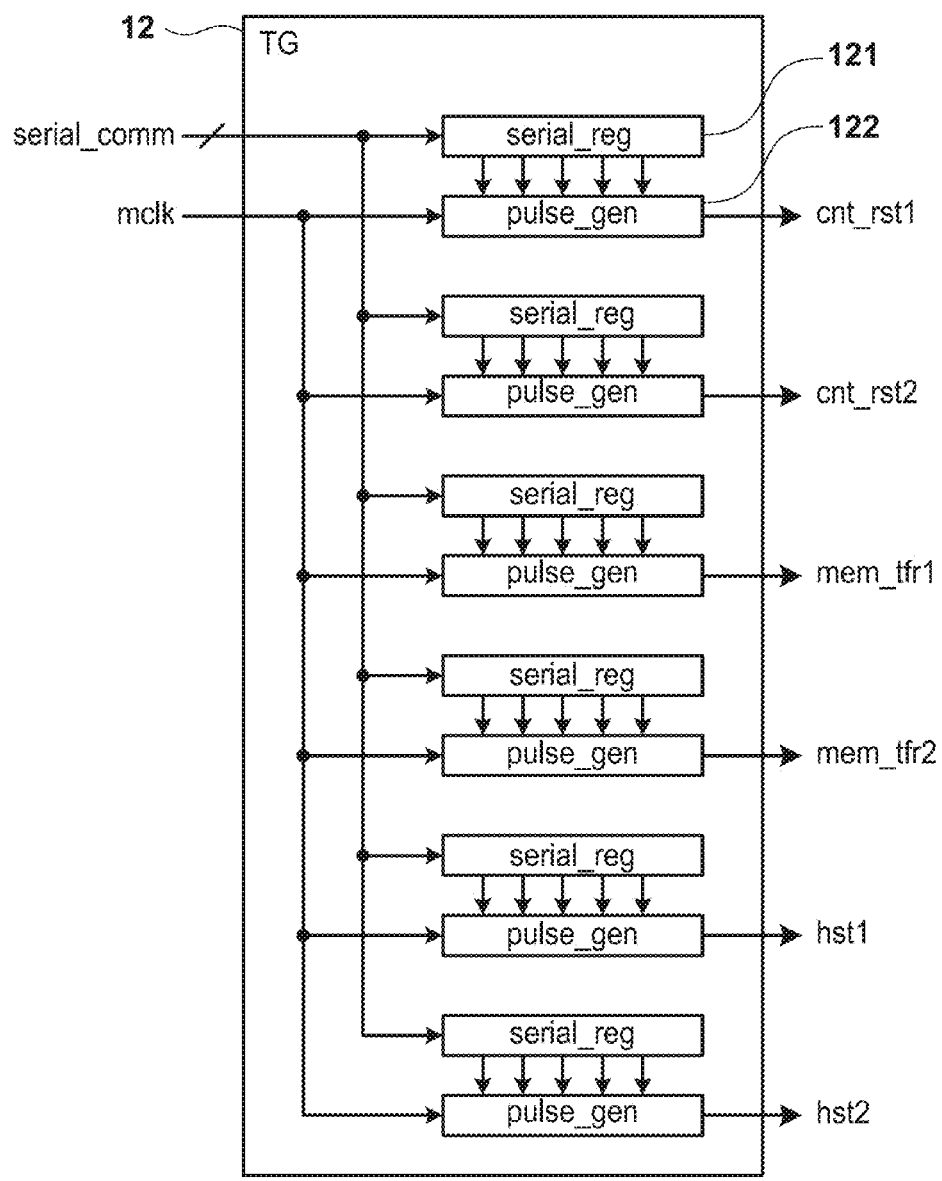
FIG. 2 is a block diagram for explaining an example of a timing generator.

FIG. 2 is a block diagram for explaining the arrangement of the timing generator 12 included in the control unit 20. As exemplified in FIG. 2, arbitrary set values can be written in respective setting registers 121 by serial communication. Pulse generators 122 can output respective control signals cnt_rst1, cnt_rst2, mem_tfr1, mem_tfr2, hst1, and hst2 in response to a master clock signal mclk in accordance with the set values of the setting registers 121. The timing generator 12 includes the independent setting registers 121 and pulse generators 122, and can individually change the pulse waveforms of the respective control signals. For example, hst1 and hst2 can have the same pulse waveform or different pulse waveforms. The control unit 20 can control the pixel array so that the pixel array 10 sequentially outputs pixel signals of a plurality of rows, two rows at a time.

Figure 3A:
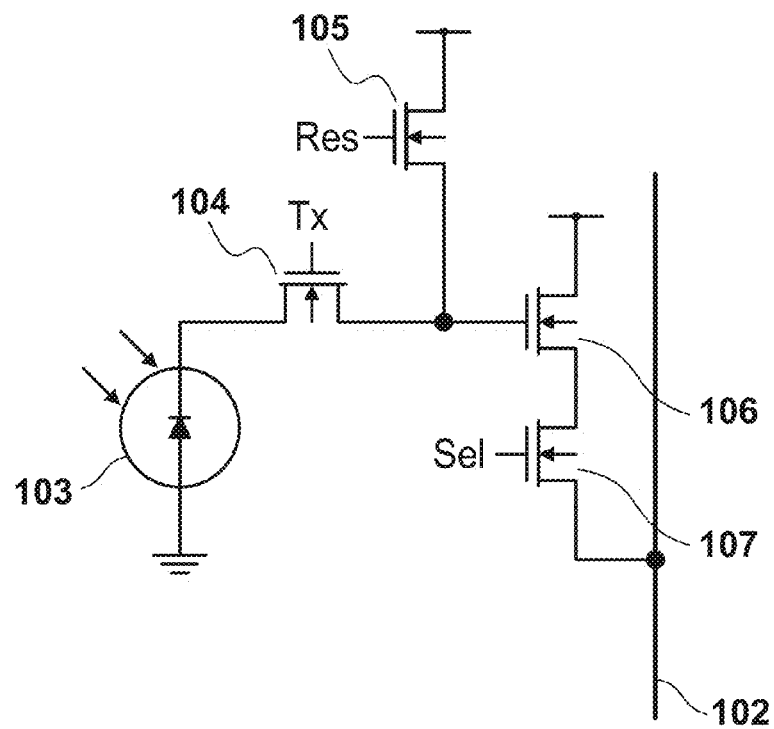
FIGS. 3A and 3B are a circuit diagram and chart for explaining an example of a pixel signal readout operation.
Figure 3B:
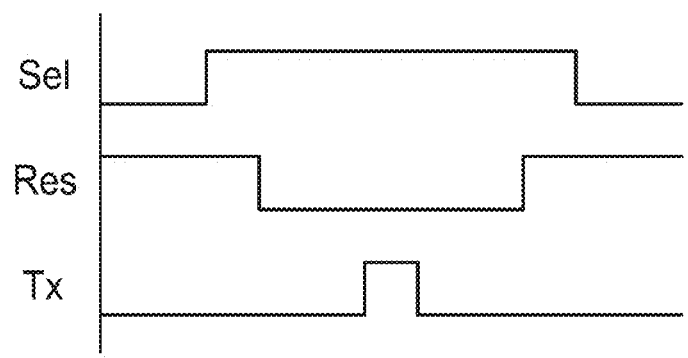
Figure 6:
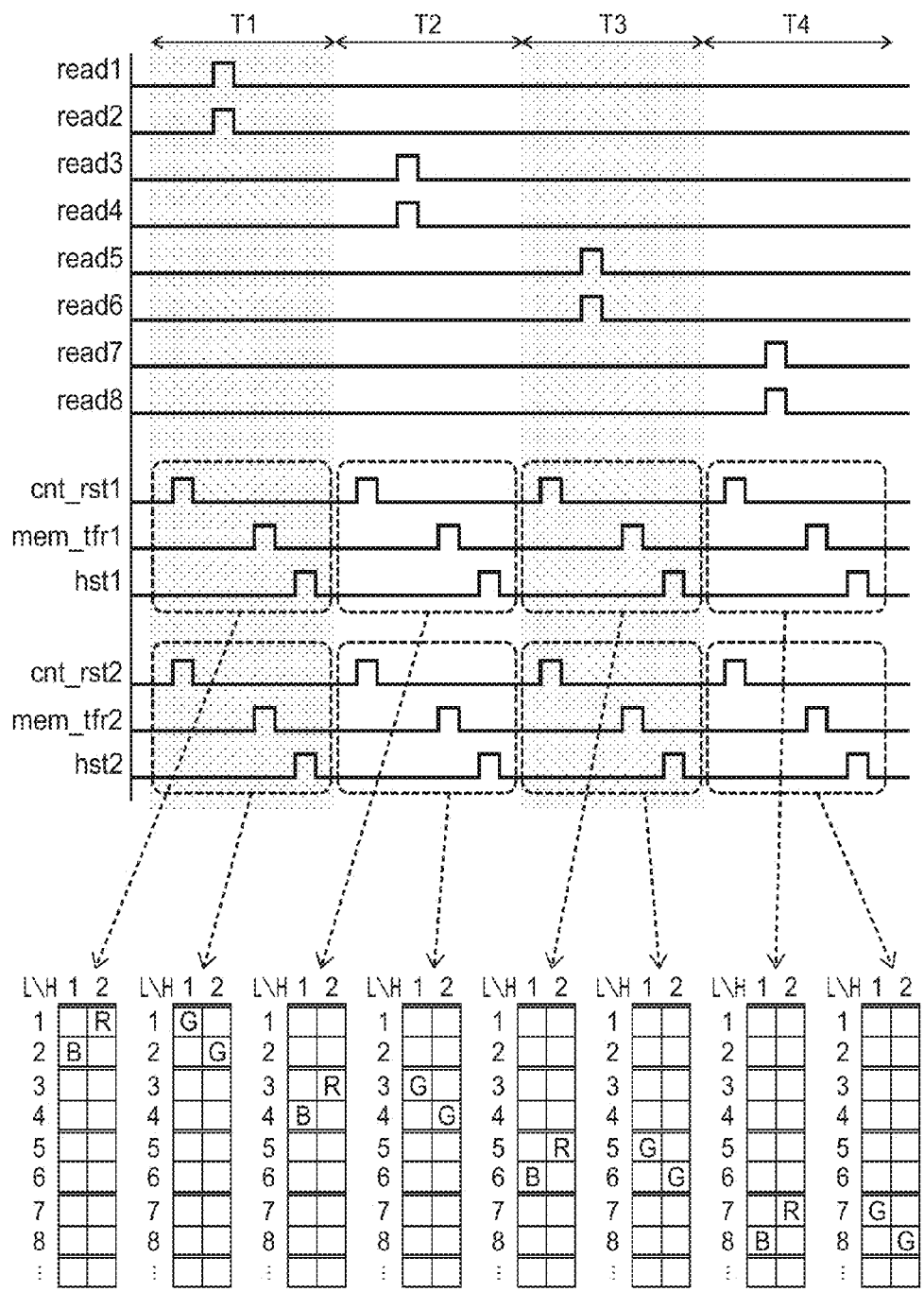
FIG. 6 is a view for explaining an example of the progressive readout operation.

FIG. 3A is a circuit diagram for explaining an example of the internal arrangement of the pixel 101. FIG. 3B exemplifies a driving method for reading out a pixel signal from the pixel 101. First, a selector transistor 107 is changed to the conductive state (control signal Sel is changed to the high state). Then, a reset transistor 105 is changed to the non-conductive state (control signal Res is changed to the low state), and the gate potential of an amplifier transistor 106 is changed to the floating state. After that, a transfer transistor 104 is changed to the conductive state (control signal Tx is changed to the high state). As a result, charges which have been generated by a photoelectric conversion element (for example, a photodiode 103) and accumulated can be transferred to the gate of the amplifier transistor 106, amplified, and read out as a pixel signal via a vertical signal line 102.

Next, an example of the progressive readout operation of the solid-state image sensor 1 and an example of the interlaced readout operation will be described. First, an example of the progressive readout operation will be explained with reference to FIGS. 4 to 6. FIG. 4 exemplifies the input patterns of respective control signals for representing the progressive readout operation of a pixel signal, and the states of the pixel signal and the like. For example, after reading out a pixel signal, the count-up operation starts upon a change of the ramp signal. Upon receiving the control signal mem_tfr, the memory 133 can hold a counter value obtained when the magnitude relationship between the ramp signal and the pixel signal is inverted and an output from the comparator 131 is inverted. Upon receiving the control signal hst, the counter value can be read out to A/D-convert a resultantly readout pixel signal. The counter value is then reset, and the readout operation of the next pixel signal is performed in the same way.

For descriptive convenience, 8×2=16 pixels in the pixel array 10 will be described, as exemplified in FIG. 5A. In FIG. 5A, "L" indicates a row, and "H" indicates a column. The progressive readout operation can be executed in accordance with a timing chart as exemplified in FIG. 6. Readout signals read1 to read8 are signals for reading out pixel signals on the first to eighth rows of the pixel array 10, and a series of operations exemplified in FIG. 3B can be performed. The remaining control signals cnt_rst1, cnt_rst2, mem_tfr1, mem_tfr2, hst1, and hst2 are the same as those described above.

In the embodiment, the vertical signal lines $102_2$ and $102_2$ are provided for each column, so pixel signals of two rows can be read out at once. In the pixel array 10, read1 and read2 are input simultaneously in the period T1. Similarly, read3 and read4 are input simultaneously in the period T2, read5 and read6 are input simultaneously in the period T3, and read7 and read8 are input simultaneously in the period T4.

As for signals read out from respective pixels, green-, red-, and blue-pixel signals on the Lth row and the Hth column will be denoted as $G_{LH}$, $R_{LH}$, and $B_{LH}$, respectively, for descriptive convenience. In the period T1, cnt_rst1 and cnt_rst2 are input to reset the count values of the counters 132 included in the first and second signal processors $13_1$ and $13_2$, and the count-up operation can start. Upon receiving read1, $G_{11}$ and $R_{12}$ can be read out. Upon receiving read2, $B_K$ and $G_{22}$ can be read out. Then, mem_tfr1 and mem_tfr2 are input, and the results (count values) of counting by the counters 132 can be stored in the memories 133 included in the first and second signal processors $13_1$ and $13_2$. Further, hst1 and hst2 are input, and the respective count values can be output to the horizontal scanning circuits 16 included in the first and second signal processors $13_1$ and $13_2$.

Accordingly, in the period T1, the first signal processor $13_1$ can read out $R_{12}$ and $B_{21}$, and the second signal processor $13_2$ can read out $G_{11}$ and $G_{22}$. Similarly in the period T2, the first signal processor $13_1$ can read out $R_{32}$ and $B_{41}$, and the second signal processor $13_2$ can read out $G_{31}$ and $G_{42}$. In the period T3, the first signal processor $13_1$ can read out $R_{52}$ and $B_{61}$, and the second signal processor $13_2$ can read out $G_{51}$ and $G_{62}$. In the period T4, the first signal processor $13_1$ can perform a signal process for $R_{72}$ and $B_{81}$, and the second signal processor $13_2$ can perform a signal process for $G_{71}$ and $G_{82}$. As for the ninth and subsequent rows, pixels signals can be read out in the same way. As indicated by double-line delimiters in FIG. 5B, respective pixel signals are sequentially output two rows at a time from the pixel array 10, and read out by the first and second signal processors $13_1$ and $13_2$.

Figure 7:
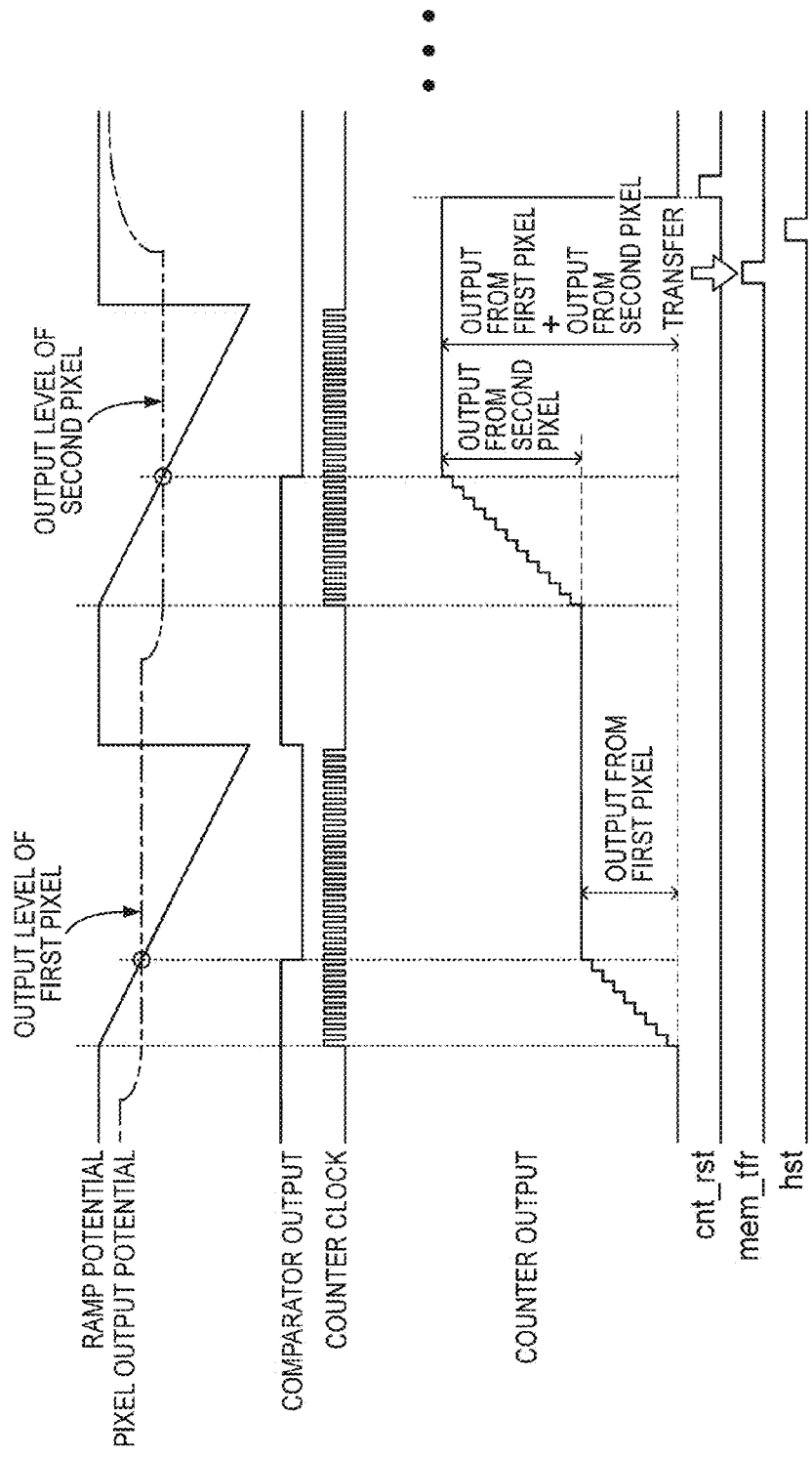
FIG. 7 is a chart for explaining an example of an interlaced readout operation.

Next, an example of the interlaced readout operation of the solid-state image sensor 1 will be explained with reference to FIGS. 5C, 5D, 7, and 8. The interlaced readout operation can be performed by sequentially repeating readout operations for odd- and even-numbered fields. In the readout operation for an odd-numbered field, pixel signals in the pixel array 10 can be sequentially read out four rows at a time, that is, the (4m−3)th, (4m−2)th, (4m−1)th, and (4m)th rows, where m is a natural number. In the readout operation for an even-numbered field, pixel signals in the pixel array 10 can be sequentially read out four rows at a time, that is, the (4m−1)th, (4m)th, (4m+1)th, and (4m+2)th rows. FIG. 7 exemplifies the input patterns of respective control signals for representing the interlaced readout operation of a pixel signal, and the states of the pixel signal and the like. For example, after reading out the first pixel signal, the count-up operation starts upon a change of the ramp signal. The second pixel signal is read out while not resetting but maintaining a counter value obtained when the magnitude relationship between the ramp signal and the pixel signal is inverted and an output from the comparator 131 is inverted. Upon a change of the next input ramp signal, the count-up operation starts again. Upon receiving the control signal mem_tfr, the memory 133 can hold a counter value obtained when the magnitude relationship between the ramp signal and the pixel signal is inverted and an output from the comparator 131 is inverted. Upon receiving the control signal hst, the counter value is read out. As a result, the pixel signal read out first and the pixel signal read out second are added and A/D-converted.

Figure 8:
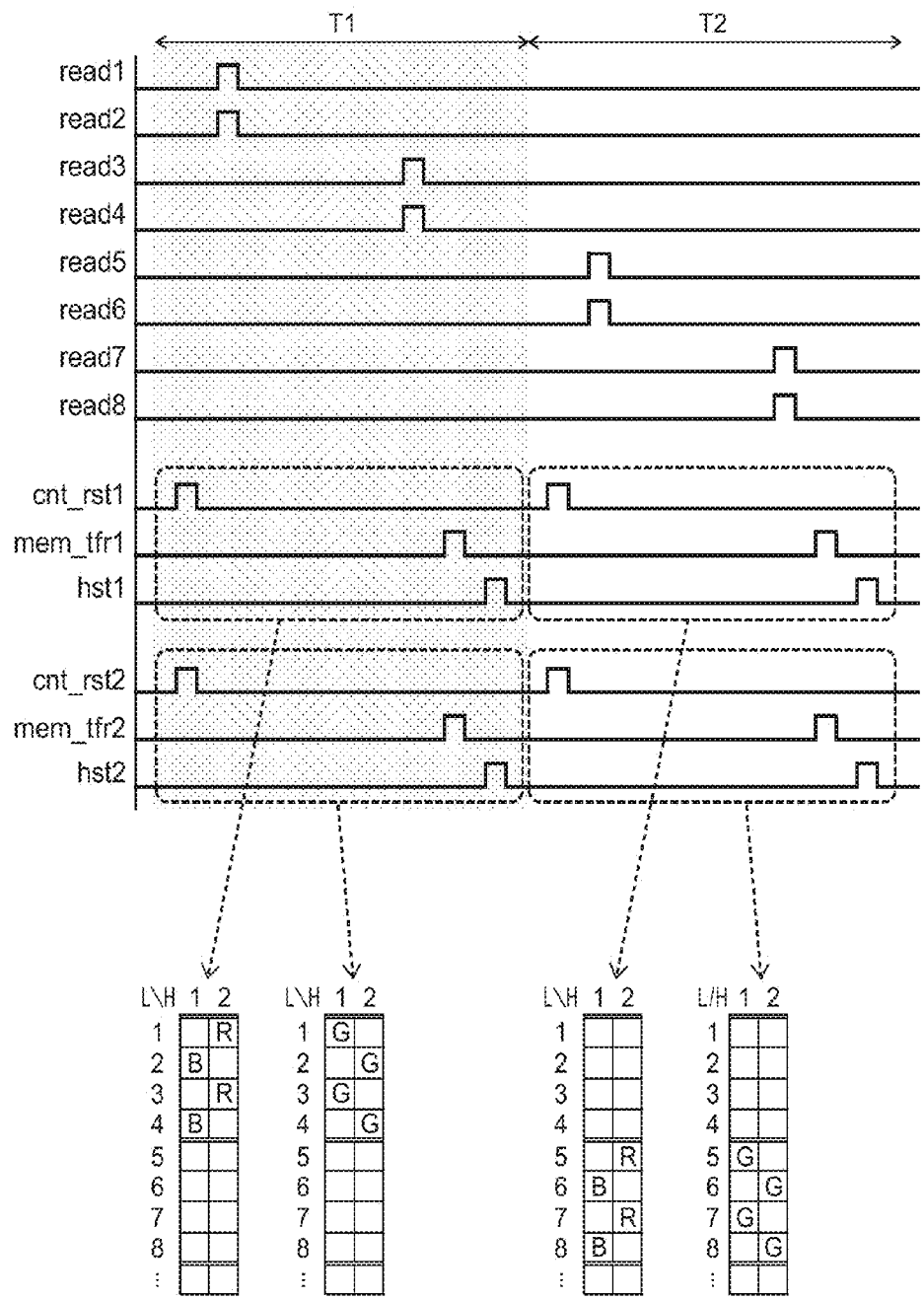
FIG. 8 is a view for explaining an example of the interlaced readout operation.

The readout operation for an odd-numbered field can be executed in accordance with a timing chart as exemplified in FIG. 8. In the period T1, cnt_rst1 and cnt_rst2 are input to reset the count values of the counters 132 included in the first and second signal processors 13$_1$ and 13$_2$, and the count-up operation can start. Then, read1 and read2 are input simultaneously. Upon receiving read1, $G_{11}$ and $R_{22}$ can be read out. Upon receiving read2, $B_{21}$ and $G_{22}$ can be read out. Subsequently, read3 and read4 are input simultaneously, and $G_{31}$, $R_{32}$, $B_{42}$, and $G_{42}$ can be read out in the same manner. As described above, the respective readout pixel signals are added, obtaining $G_{11}+G_{31}$, $R_{22}+R_{32}$, $B_{21}+B_{41}$, and $G_{22}+G_{42}$.

After that, mem_tfr1 and mem_tfr2 are input, and the results (count values) of counting by the counters 132 can be stored in the memories 133 included in the first and second signal processors 13$_1$ and 13$_2$. Further, hst1 and hst2 are input, and the respective count values can be output to the horizontal scanning circuits 16 included in the first and second signal processors 13$_1$ and 13$_2$. Accordingly, the first signal processor 13$_1$ reads out $R_{12}+R_{32}$ and $B_{21}+B_{41}$, and the second signal processor 13$_2$ reads out $G_{11}+G_{32}$ and $G_{22}+G_{42}$.

In the same fashion, in the period T2, read5 and read6 are input simultaneously, read7 and read8 are input simultaneously, and the same process as the above one can be executed. In the progressive readout operation, the readout process is performed for pixel signals of one row. To the contrary, in the interlaced readout operation, the readout process is performed for pixel signals of two rows. Thus, the interlaced readout operation can quickly read out pixel signals from the pixel array 10.

As exemplified in FIG. 8, in the period T1, the first signal processor 13$_1$ performs the readout process for $R_{12}$, $R_{32}$, $B_{21}$, and $B_{41}$. The second signal processor 13$_2$ performs the readout process for $G_{11}$, $G_{31}$, $G_{22}$, and $G_{42}$. Similarly, in the period T2, the first signal processor 13$_1$ performs the readout process for $R_{52}$, $R_{72}$, $B_{61}$, and $B_{81}$. The second signal processor 13$_2$ performs the readout process for $G_{51}$, $G_{71}$, $G_{62}$, and $G_{82}$. As for pixel signals of the ninth and subsequent rows, these readout processes are repetitively performed in the same way.

As indicated by double-line delimiters in FIG. 5C, the readout process can be performed for the pixel array 10, four rows at a time, that is, the (4m−3)th, (4m−2)th, (4m−1)th, and (4m)th rows, where m is a natural number. After performing the readout operation for an odd-numbered field, the readout operation for an even-numbered field can be performed. As for an even-numbered field, as indicated by double-line delimiters in FIG. 5D, the readout process can be performed for the pixel array 10 four rows at a time, that is, the (4m−1)th, (4m)th, (4m+1)th, and (4m+2)th rows.

As described above, the first signal processor 13$_1$ can perform the first signal process including a signal process for output red-pixel signals and a signal process for output blue-pixel signals every time output of two rows from the pixel array is executed twice. Similarly, the second signal processor 13$_2$ can perform the second signal process including a signal process for output green-pixel signals every time output of two rows from the pixel array is executed twice.

Figure 9:
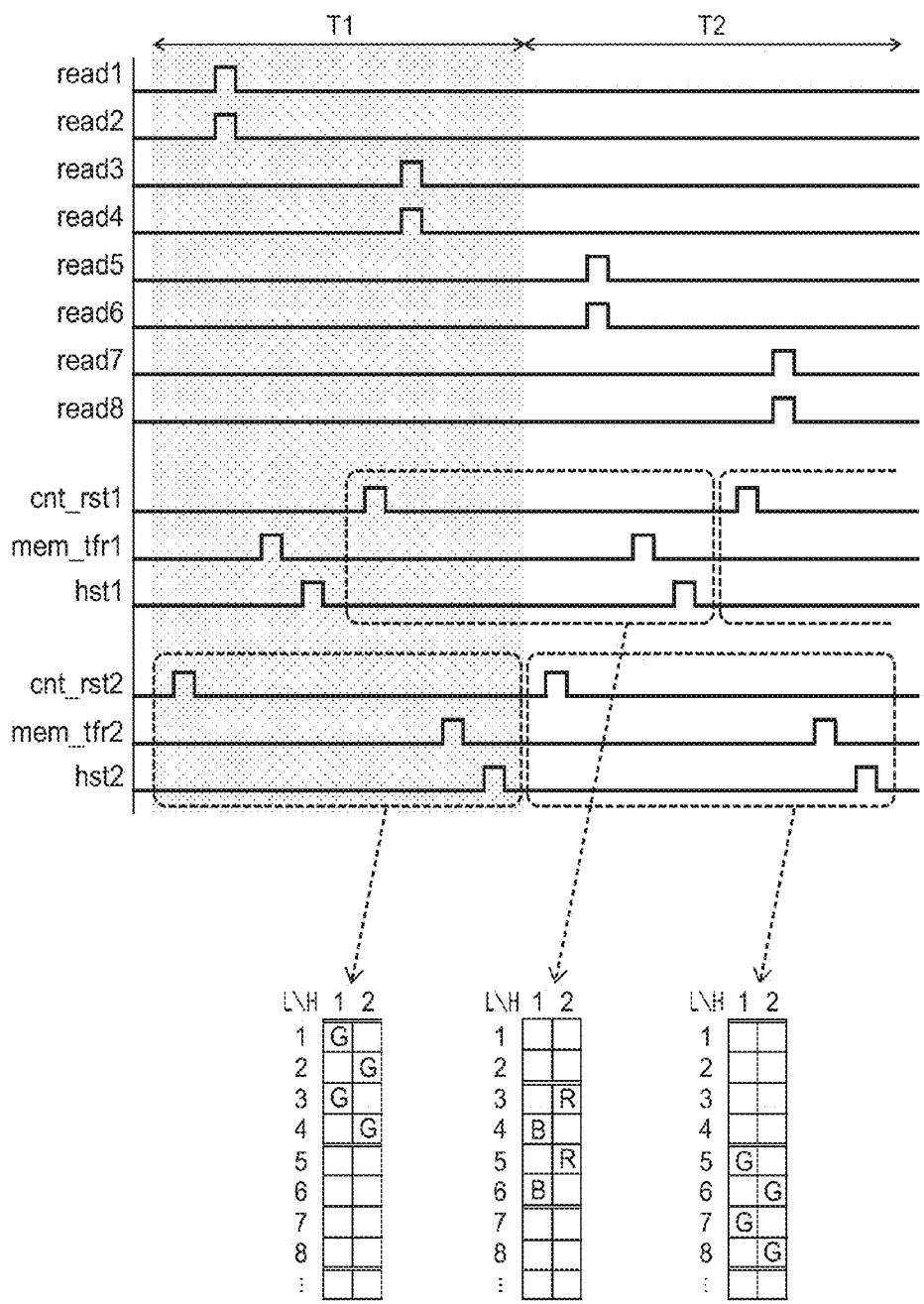
FIG. 9 is a view for explaining an example of a readout operation according to the present invention.

A readout operation exemplified in FIG. 9 (to be referred to as a "pseudo-progressive method" hereinafter) will be explained. The pseudo-progressive readout operation is different from the interlaced readout operation in the timings when the respective control signals are input to the first and second signal processors 13$_1$ and 13$_2$. That is, the first signal process and second signal process performed by the interlaced readout operation are performed at different timings. The time of each of the first and second signal processes is defined as one cycle, and these timings suffice to shift by, for example, half the cycle. As exemplified in FIG. 9, the input timings of cnt_rst1, mem_tfr1, and hst1, and those of cnt_rst2, mem_tfr2, and hst2 shift by half the cycle.

Hence, a readout process for $R_{32}$, $R_{52}$, $B_{41}$, and $B_{61}$ is performed while a readout process for $G_{11}$, $G_{31}$, $G_{22}$, and $G_{42}$ and a readout process for $G_{51}$, $G_{71}$, $G_{62}$, and $G_{32}$ are performed. Readout processes individually performed by the first and second signal processors 13$_1$ and 13$_2$ are the same as the operations performed in the interlaced readout operation, and a description thereof will not be repeated.

In this manner, red- and blue-image signals for an even-numbered field can be generated while generating green-image signals for an odd-numbered field. After the series of operations, red- and blue-image signals for an odd-numbered field can be generated while generating green-image signals for an even-numbered field.

The first image interpolation signal can be calculated by, for example, an arithmetic unit (not shown) based on the first image signal serving as an image signal generated by the first signal process. The arithmetic unit may be included in the solid-state image sensor 1 or connected after the solid-state image sensor 1. Similarly, the second image interpolation signal can be calculated based on the second image signal serving as an image signal generated by the second signal process. Thereafter, an image signal containing the first image signal and first image interpolation signal, and an image signal containing the second image signal and second image interpolation signal can be generated.

As described above, in a single-chip solid-state image sensor, while reading out pixel information of the pixel array by the interlace method, image signals equal in number to those read out by the progressive method can be generated to perform the pseudo-progressive readout operation. By changing the timings of the control signals using the solid-state image sensor 1, a desired readout method can be selected from the progressive method, interlace method, and pseudo-progressive method.

Second Embodiment

Figure 10:
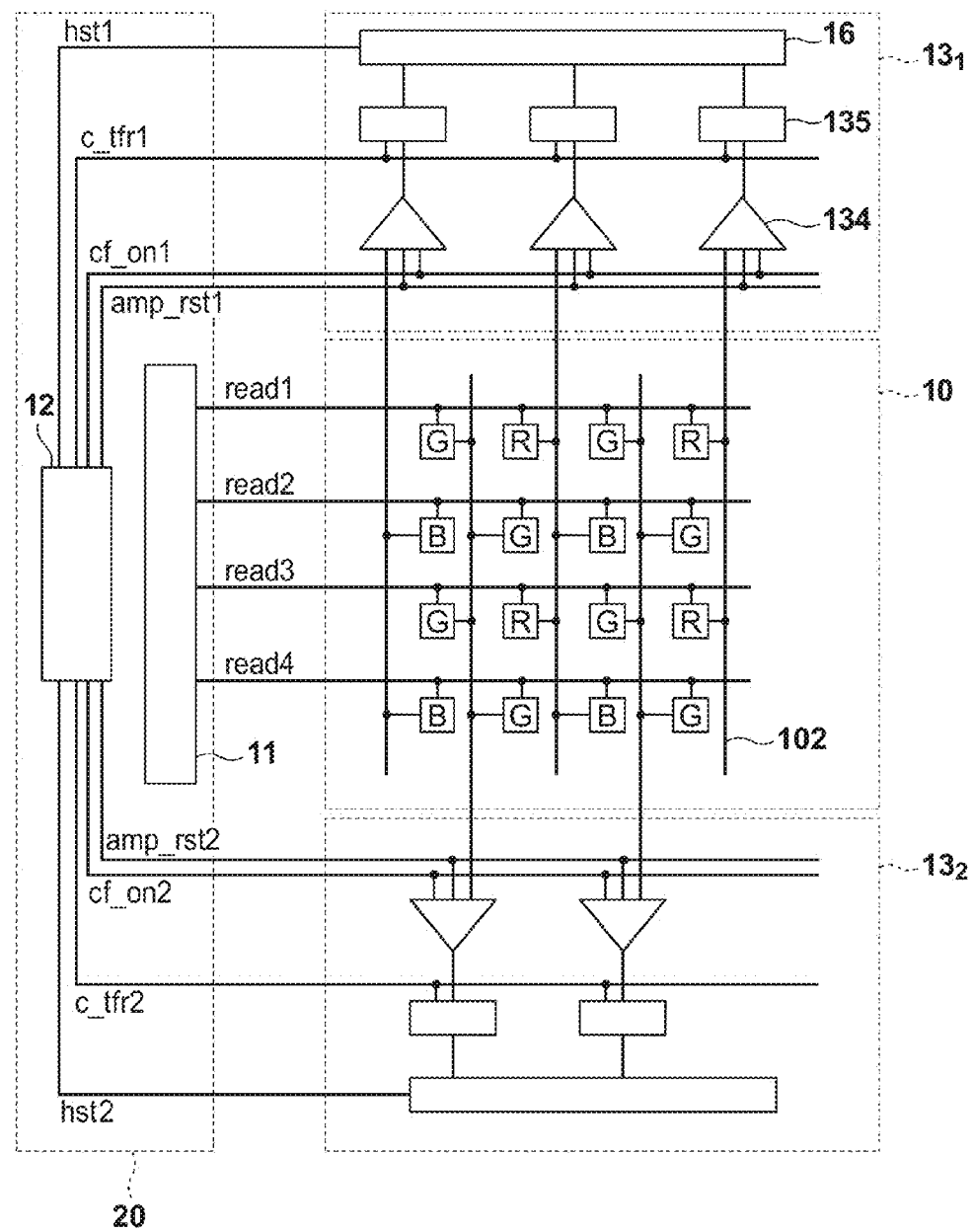
FIG. 10 is a circuit diagram for explaining an example of an arrangement according to the second embodiment.
Figure 11:
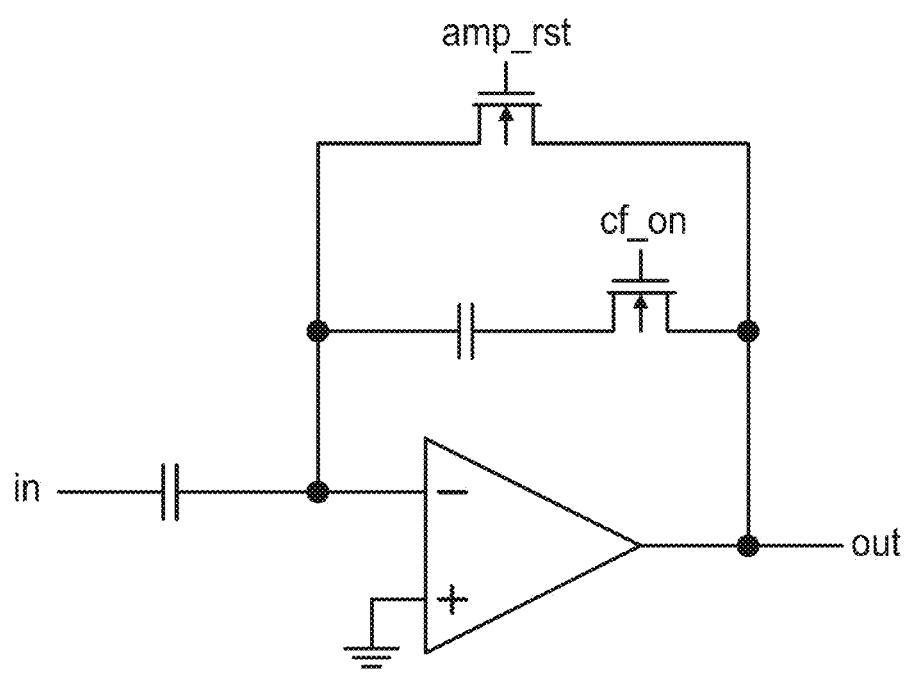
FIG. 11 is a circuit diagram for explaining an example of the arrangement of an amplifier.

A solid-state image sensor 2 according to the second embodiment will be described with reference to FIGS. 10 and 11. In the first embodiment, two vertical signal lines are arranged for each column of the pixel array. The second embodiment is different from the first embodiment mainly in that one vertical signal line 102 is arranged for each column of the pixel array, as exemplified in FIG. 10. In this case, the readout speed becomes lower than in the first embodiment. However, the second embodiment can also achieve the same effects as those of the first embodiment by performing the following operation to sequentially read out pixel signals of a plurality of rows from the pixel array two rows at a time.

In the solid-state image sensor 2, the respective vertical signal lines 102 can be connected to corresponding amplifiers 134. FIG. 11 exemplifies the arrangement of the amplifier 134. For example, one of two pixel signals to be added later can be amplified by the amplifier 134. Upon receiving a control signal c_tfr, the pixel signal is held in, for example, the first holding capacitor (not shown) included in a signal holding unit 135. In the signal amplification, control signals cf_on and amp_rst for the amplifier 134 are changed to the high state to reset the amplifier 134. While maintaining cf_on in the high state, amp_rst is changed to the low state. An analog signal input from the in terminal can be amplified and output from the out terminal.

Then, the amplifier 134 is reset again. The other one of the two pixel signals to be added later can be similarly held in, for example, the second holding capacitor (not shown) included in the signal holding unit 135. The analog signals held in the first and second holding capacitors can be added, sequentially output from a horizontal scanning circuit 16, and undergo a predetermined signal process. In the first embodiment, a signal process based on addition is performed for a digital signal after A/D-converting a readout pixel signal. However, before A/D conversion, as in the second embodiment, a signal process may be performed for a pixel signal which is a readout analog signal.

As described above, the second embodiment can also achieve the same effects as those of the first embodiment. In the second embodiment, similar to the first embodiment, a desired readout method can be selected from the progressive method, interlace method, and pseudo-progressive method by changing the timings of the control signals.

Although the two embodiments have been described, the present invention is not limited to them. The purpose, state, application, function, and other specifications can be properly changed, and the present invention can be practiced by another embodiment, as a matter of course. Part or all of the operation control of each functional block may be performed by an OS or the like running on a computer, together with or instead of the control unit.

These embodiments have been described for a solid-state image sensor included in a camera. However, the concept of the camera includes not only an apparatus mainly aiming at shooting, but also an apparatus accessorily having the shooting function (for example, personal computer or mobile terminal). The camera can include the solid-state image sensor according to the present invention which has been exemplified as the embodiment, and a processing unit which processes a signal output from the solid-state image sensor. The processing unit can include, for example, an A/D converter, and a processor which processes digital data output from the A/D converter.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-002473, filed Jan. 10, 2012, which is hereby incorporated by reference herein in its entirety.

What is claimed is:

1. A solid-state image sensor comprising:
a pixel array;
a color filter array complying with a Bayer array, the color filter array provided in correspondence to the pixel array;
a first signal processor configured to process each of red-pixel and blue-pixel signals output from the pixel array;
a second signal processor configured to process each of green-pixel signals output from the pixel array; and
a control unit configured to control the pixel array, the first signal processor, and the second signal processor,
wherein the control unit controls the pixel array to sequentially output pixel signals of a plurality of rows from the pixel array by selecting two rows at a time,
the first signal processor performs a first signal process including an addition process for red-pixel signals output by performing twice the output of two rows from the pixel array, and an addition process for blue-pixel signals output by performing twice the output of two rows from the pixel array,
the second signal processor performs a second signal process including an addition process for green-pixel signals output by performing twice the output of two rows from the pixel array, and
the first signal process and the second signal process are performed at timings different from each other, a red-image signal and blue-image signal for a first field of the pixel array are generated while generating green-image signals for a second field of the pixel array subsequent to the first field, and a red-image signal and blue-image signal for the second field are generated while generating green-image signals for the first field.

2. The sensor according to claim 1, wherein
a first image interpolation signal is calculated based on a first image signal serving as an image signal generated by the first signal process, and a second image interpolation signal is calculated based on a second image signal serving as an image signal generated by the second signal process, and
an image signal containing the first image signal and the first image interpolation signal, and an image signal containing the second image signal and the second image interpolation signal are generated.

3. The sensor according to claim 1, wherein each of signal processes for the red-pixel signal, the blue-pixel signal, and the green-pixel signal that are performed every time the output of two rows is performed twice includes an addition process for each of the red-pixel signal, the blue-pixel signal, and the green-pixel signal obtained by the output of two rows.

4. The sensor according to claim 3, wherein the addition process is performed before performing analog-to-digital conversion for the pixel signal which is a readout analog signal.

5. A camera comprising:
a solid-state image sensor defined in claim 1; and
a processing unit which processes a signal output from the solid-state image sensor.

6. A method of driving a solid-state image sensor including a pixel array, a color filter array complying with a Bayer array provided in correspondence to the pixel array, a first signal processor configured to process each of red-pixel and blue-pixel signals output from the pixel array, and a second signal processor configured to process each of green-pixel signals output from the pixel array, the pixel array being controlled to sequentially output pixel signals of a plurality of rows from the pixel array by selecting two rows at a time, the method comprising:
a first step of causing the first signal processor to perform a first signal process including an addition process for red-pixel signals output by performing twice the output of two rows from the pixel array, and an addition process for blue-pixel signals output by performing twice the output of two rows from the pixel array; and
a second step of causing the second signal processor to perform a second signal process including an addition process for green-pixel signals output by performing twice the output of two rows from the pixel array,
wherein the first step and the second step are performed at timings different from each other, a red-image signal and blue-image signal for a first field of the pixel array are generated while generating green-image signals for a second field of the pixel array, and a red-image signal and blue-image signal for the second field are generated while generating green-image signals for the first field.

\* \* \* \* \*